U.S. Patent Number: 5,253,058
Date of Patent: Oct. 12, 1993

United States Patent [19]
Gharavi

[54] EFFICIENT CODING SCHEME FOR MULTILEVEL VIDEO TRANSMISSION

[75] Inventor: Hamid Gharavi, Middletown Township, Monmouth County, N.J.

[73] Assignee: Bell Communications Research, Inc., Livingston, N.J.

[21] Appl. No.: 861,627

[22] Filed: Apr. 1, 1992

[51] Int. Cl.⁵ .................. H04N 7/13; H04N 7/137
[52] U.S. Cl. ........................... 358/136; 358/133; 358/135
[58] Field of Search .................. 358/133, 135, 136

[56] References Cited

U.S. PATENT DOCUMENTS

| | | | |
|---|---|---|---|
| 4,578,704 | 3/1986 | Gharavi | 358/135 |
| 4,821,119 | 4/1989 | Gharavi | 358/136 |
| 4,918,524 | 4/1990 | Ansari et al. | 358/138 |
| 4,958,226 | 9/1990 | Haskell et al. | 358/136 |
| 4,969,040 | 11/1990 | Gharavi | 358/135 |
| 5,083,206 | 1/1992 | Knauer et al. | 358/136 |
| 5,128,754 | 7/1992 | Dhein | 358/136 |
| 5,136,615 | 8/1992 | Tanoi | 358/136 |

OTHER PUBLICATIONS

"Coding of Moving Pictures and Associated Audio", ISO/IEC/JTC1/SC2/WG11 CD 11172-2, Aug., 1991.
"Video Codec for Audiovisual Service at p x 64 kbits/s", CCITT/COMXV/RAPP/R037E4,TXS, pp. 79-123.

Primary Examiner—Tommy P. Chin
Assistant Examiner—Richard Lee
Attorney, Agent, or Firm—Leonard Charles Suchyta; Stephen M. Gurey

[57] ABSTRACT

A highly efficient video coding scheme is disclosed which codes, for transmission, the pel values of a scanned high quality HDTV video signal in such a manner that a low-quality version of the signal as well as a high-quality version are available to different video subscribers. The coder includes a basic layer coder (110) and a contribution layer encoder (150). A subscriber to a low-quality video service receives only the basic layer signal while a high-quality video subscriber receives both the basic layer signal and the contribution layer signal, which when combined together enable the high quality video signal to be reconstructed. The basic layer coder codes the baseband of a frequency decomposed video signal using a hybrid discrete cosine transform/differential pulse code modulation coding structure, such as the CCITT recommended H.261 coder. The contribution layer coder decomposes (123) a differential high quality video signal and separately quantizes (124) and entropy codes (125) the decomposed differential subbands other than the baseband, which are then multiplexed (126) together to form the contribution layer signal. When the baseband is coded by the basic layer coder at a low bit rate, the quantization noise it introduces will deleteriously affect the quality of a high quality signal "built" upon it. A residual signal component is therefore included within the contribution layer signal. This residual layer component, which is derived in part from the basic layer coder, enables the quantization noise introduced into the basic layer to be substantially eliminated when the basic layer signal is combined with the contribution layer signal to reconstruct the high quality video signal at a receiver/decoder.

15 Claims, 5 Drawing Sheets

EFFICIENT CODING SCHEME FOR MULTILEVEL VIDEO TRANSMISSION

BACKGROUND OF THE INVENTION

This invention relates to the coding of video signals, and more particularly to a coding scheme that is capable of simultaneously transmitting both low quality coded video signals using existing coding standards, and high quality coded video signals.

The CCITT has recently recommended a coding scheme for video-phone and video-conferencing services ("Video Codec for Audiovisual Service at p×64 kbits/s" CCITT recommendation H.261, CCITT-/COMXV/RAPP/R03TE4.TXS). This standardized codec is designed to operate at very low speeds (i.e., at multiple rates of 64×n(n=1–32) kb/s for video-phone and video-conferencing applications). For video-conferencing the spatial and temporal resolution of the input is set at 352 (pels) [reduced from original 360 pels so as to be evenly divisible into blocks 16 pels wide]×288 (lines) and 29.97 frames/sec, respectively (Common Intermediate Format, CIF). For video-phone, where the transmission rate is lower (i.e., 64 kb/s), the spatial resolution is reduced to ¼ CIF (i.e., 176×144). Consequently, at these speeds and resolutions, the codec may be unable to produce video with the quality that can support all the needs of the business community. The proposed standard, however, is expected to provide worldwide availability of the CCITT codec at a reasonably low cost.

With the expected wide deployment of optical facilities in the near future, and the availability of broadband systems such as Broadband ISDN (BISDN), a wider range of higher quality digital video services will likely be in demand, where quality is generally meant to mean spatial resolution (i.e., the number of pels per scan line×the number of scan lines per video frame). It is reasonable, therefore, to expect a wide range of quality video services, such as Extended Quality Television (EQTV), High Definition Television (HDTV), and future super HDTV, to be available together with the lower-quality video services such as the video-phone and video-teleconferencing services. To maximize the integration of all these various quality video services, a single coding system which can provide an unlimited range of video services is desirable. Such a coding system would enable users of different qualities to communicate with each other. For example, a subscriber to only a lower quality grade of video service should be capable of decoding and reconstructing a digitally transmitted higher quality video signal, albeit at the lower quality service level to which he subscribes. Similarly, a higher quality service subscriber should be capable of decoding and reconstructing a digitally transmitted lower quality video signal although, of course, its subjective quality will be no better than its transmitted quality.

In addition to enabling different quality grade video service subscribers to communicate with each other, a system architecture that utilizes basic hardware building blocks for all levels of service would permit the upward migration of a lower quality grade video service subscriber to a higher quality grade service subscriber without the costly expense of replacing his already installed lower quality grade video service hardware.

In a co-pending patent application of the inventor herein, Ser. No. 673,958, filed Mar. 22, 1991, a multi-layer coding algorithm for the transmission of high quality video with full compatibility to the CCITT H.261 standard coder/decoder for video-phone is disclosed. The coding algorithm of the present invention has improved efficiency in terms of compression. Furthermore, the efficiency of the algorithm of the present invention remains substantially unaffected by the constraint that it remain compatible with existing lower video quality standards.

SUMMARY OF THE INVENTION

In accordance with the present invention, a high quality digital video signal is decomposed in frequency in the horizontal, vertical or both directions. The decomposition is performed so that the baseband, the lowest frequency band in the horizontal and vertical directions of the multiple decomposed bands, is spatially compatible for coding by a standardized highly efficient coding structure. In particular, the baseband or basic layer coder is a hybrid discrete cosine transform-/differential pulse code modulation (DCT/DPCM) coder, which in the preferred embodiment is the aforenoted CCITT recommended H.261 coder structure. For each high quality (e.g., HDTV) video frame of picture element (pels), the elements that comprise this lowest frequency band represent the picture elements of a "mini" frame, i.e., the elements of a video image of which the spatial resolution has been proportionately reduced from the spatial resolution of the high quality input in accordance with the degree of filtering effected by the two-dimensional decomposition. This band, representing the basic layer, is transmitted in a separate channel for reception by those low-quality video subscribers having a compatible H.261 terminal. Such subscribers can then reconstruct the lower quality video version of the original high quality video signal that is present at the transmitter. Subscribers to the high quality video service receive a contribution layer via a separate channel in addition to the basic layer. This contribution layer is formed by the transmitter/coder by frequency decomposing an interframe differential digital video signal and then quantizing and entropy coding each of the higher frequency bands of the decomposed differential video signal using a combination of variable length coding and run-length coding. The resultant entropy coded higher frequency differential band signals are then multiplexed together to form the contribution layer, which is transmitted on a channel separate from the basic layer. As noted, a subscriber to high quality video service receives both the basic layer and the contribution layer and this subscriber's receiver/decoder reconstructs the transmitted higher level video signal by combining the received contribution layer with the basic layer.

Since the lowest frequency band contains the baseband signal and is the band upon which all the other higher frequency bands "sit", in those cases in which the basic layer is coded at a very low bit rate, such as 64 kb/s for video-phone service, the substantial quantization noise necessarily introduced to the lowest frequency band, which is the basic layer, will deleteriously affect the quality of the reconstructed higher quality signal. Thus, if the baseband is coded at only 64 kb/s, no matter how accurately the upper frequency bands are coded, the overall quality of the "high quality" video signal reconstructed from the combination of the basic and contribution layers will have significant visual impairments. In order to minimize the effect of this baseband quantization noise in the reconstruction of the high quality video signal from the combination of both the basic layer and the contribution layer, a residual signal is included as one of the separable signal components within the contribution layer. Specifically, a difference is formed between the locally reconstructed baseband signal from the basic layer encoder and the equivalent baseband of the full-bandwidth reconstructed signal of the previous frame in the contribution layer encoder. A residual signal component is then formed from the difference between that difference and the differential baseband, which resultant difference can be shown to be substantially equal to only the quantization noise introduced to the baseband by the basic layer encoder. This residual signal component is quantized, entropy coded, and multiplexed with the other quantized and entropy coded higher-band bandwidth-split differential signals that comprise the contribution layer. By designing the quantizer for this residual signal component in the contribution layer coder so that the quantization noise it imposes is substantially less than the quantization noise imposed by the quantizer in the coder in the basic layer (i.e., by using finer quantization levels), the lowest frequency level differential signal can be derived at the receiver substantially free of the basic layer quantization noise. The receiver/decoder is thus able to reconstruct the high quality input signal free of the basic layer quantization noise which would otherwise significantly impair the quality of the reconstructed video signal.

DETAILED DESCRIPTION

Figure 1:
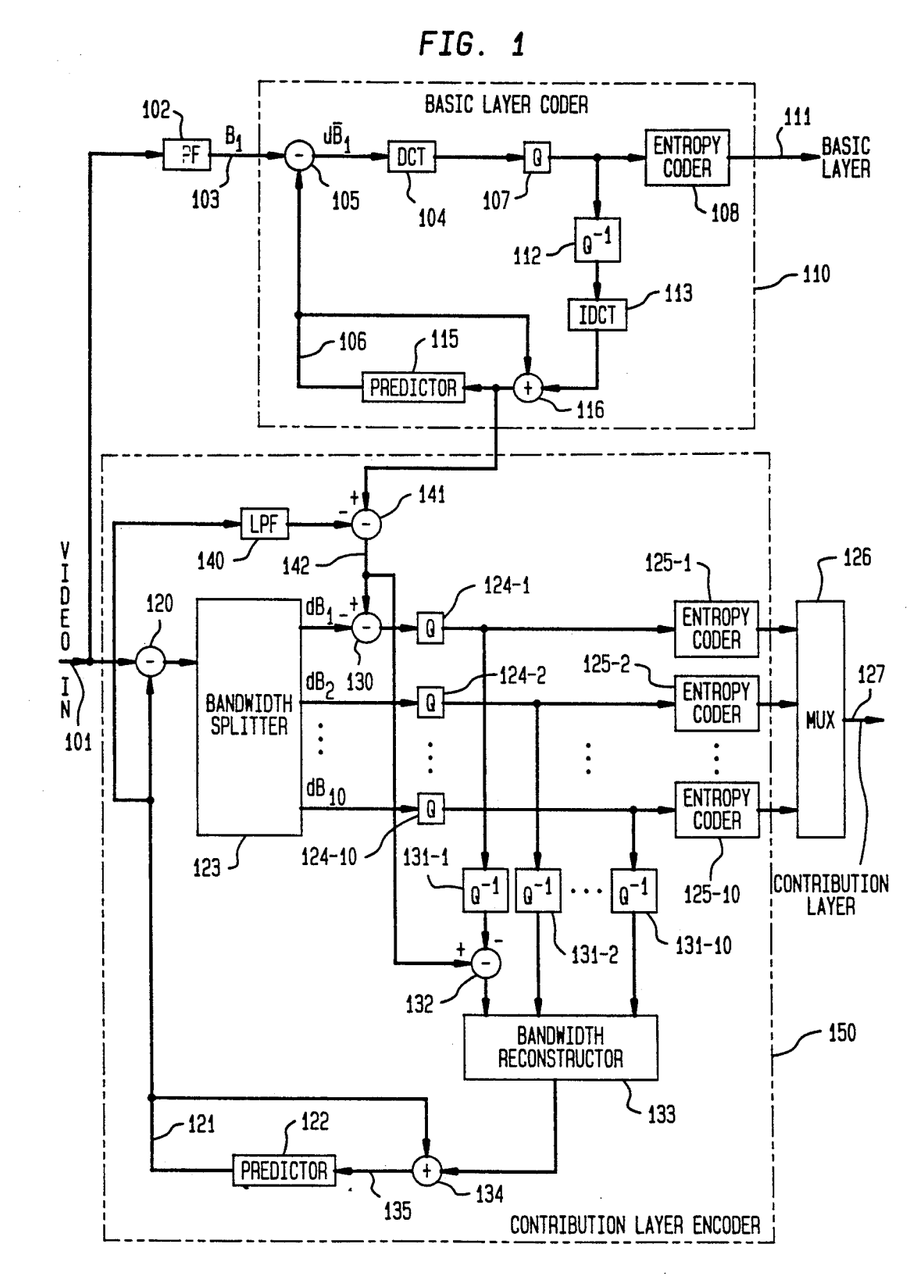
FIG. 1 is a block diagram of an embodiment of the multilevel coder in accordance with the present invention.

With reference to the embodiment of a multilevel coder of the present invention shown in FIG. 1, an HDTV digital video signal is input on lead 101. This signal is formatted in frames of pel data, wherein each frame consists of a fixed number of pels per scan line and a fixed number of scan lines per frame. Since standards have not yet been adopted for the format of an HDTV signal, for purposes of the embodiment described herein, it is assumed that the format of each digital HDTV video frame is equal to a 16-CIF, or equivalently 1408 pels×1152 scan lines. The basic layer, representing a video-phone signal, will be assumed to be coded for compatibility with the standardized H.261 coder for transmission at the low bit rate of 64 kb/s, with a frame format of 176 pels×144 line, or QCIF (quarter-CIF). By making the assumption that the spatial resolution of the HDTV frame is integrally related to the spatial resolution of the video-phone frame, the HDTV signal of this format can be readily reduced to the QCIF format for coding by the H.261 coder without any special treatments such as non-integral sampling rate conversion.

Figure 2:
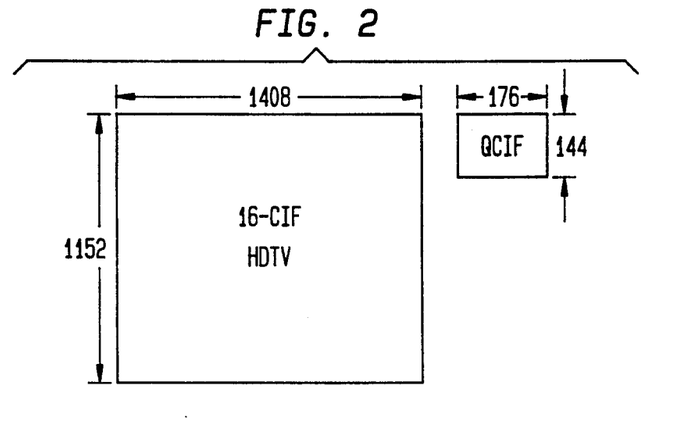
FIG. 2 shows the spatial resolution of the high quality input video signal and the lower quality video signal transmitted in the basic layer.

FIG. 2 graphically shows the formats of both the full frame 16-CIF HDTV signal and the baseband QCIF signal. As can be noted, the HDTV frame has 64 times the spatial resolution of the baseband frame, or equivalently eight times as many pels per scan line and eight times as many scan lines per frame.

Figure 3:
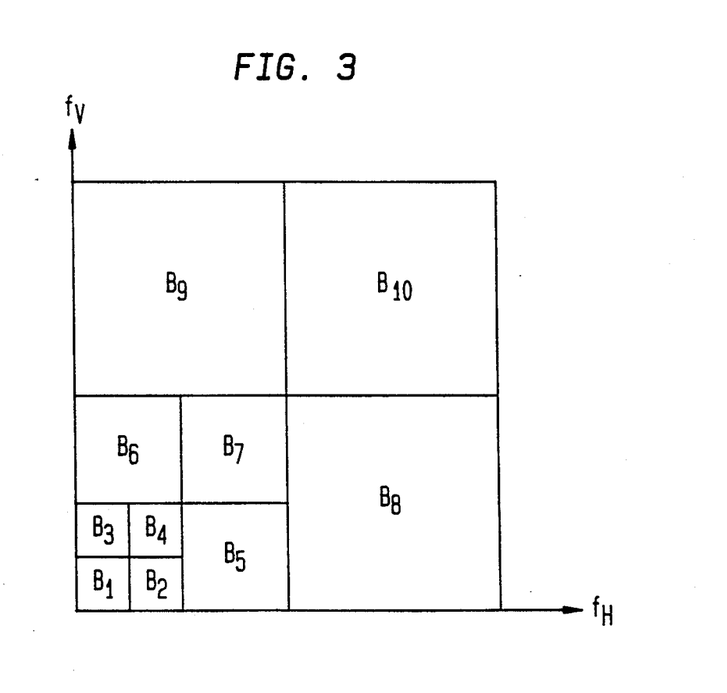
FIG. 3 shows the two-dimensional frequency decomposition of the high quality input signal into multiple bands including the low frequency baseband signal.

FIG. 3 shows the two-dimensional frequency spectrum of the input HDTV signal as decomposed in the horizontal and vertical directions into ten non-uniform subbands. As can be noted, the baseband $B_1$ occupies one-eighth the vertical and horizontal spectrums of the full HDTV bandwidth, or one-sixty-fourth of the two-dimensional spectrum.

With reference back to FIG. 1, the HDTV digital signal on input lead 101 is applied to a low-pass filter 102. Low-pass filter 102 is a two-dimensional digital filter which reduces the spatial resolution of the HDTV video signal on input 101 by a factor of eight in both the horizontal and vertical directions. The output of filter 102 on lead 103 is the baseband signal $B_1$, and is substantially equivalent to the lowest frequency band of a 10-band non-uniform quadrature-mirror filter decomposition of the HDTV signal. This baseband signal $B_1$ has the signal format of 176 pels ×144 scan lines per video frame and thus has a format that is compatible for coding at 64 kb/s by a standardized basic layer encoder 110 such as the CCITT H.261 coder. This baseband signal is a "mini" frame version of the HDTV frame on input 101.

Basic layer encoder 110 is a hybrid discrete cosine transform/differential pulse code modulation (DCT/DPCM) coder, which is described in the aforenoted CCITT reference, and which is also described in U.S. Pat. No. 4,821,119 issued to the inventor herein on Apr. 11, 1989. Encoder 110 includes a signal transformer 104 which performs a discrete cosine transform on the differential signal $d\bar{B}_1$ formed by subtracter 105 from the difference between the baseband signal $B_1$ and a predicted signal on lead 106. Specifically, transformer 104 operates on 8×8 blocks of differential pel elements formed from the difference between blocks of filtered pel values in the "mini" frame on lead 103, and blocks of predicted pel values on lead 106, which are determined from spatially corresponding blocks in the previous video frame and which are stored in predictor 115. For purposes of the discussion herein, it will be assumed that predictor 115 does not include motion estimation to determine the predicted pel values. The effect of including motion estimation in the multi-layer coding algorithm of the present invention will be considered separately in a later discussion.

The output of transformer 104 consists of 8×8 blocks of DCT coefficients which are quantized by quantizer 107. These quantized coefficients are entropy coded by entropy coder 108 using a combination of run-length coding to code runs of zero and non-zero coefficients and variable-length coding to code the actual non-zero quantized coefficient values. The resultant bit stream is outputted onto transmission channel 111. This signal transmitted onto channel 111 represents the basic layer from which the video-phone subscribers can reconstruct the lower quality version of the HDTV signal at input 101.

Within the encoder 110 the video frame is reconstructed from the quantized transform coefficients at the output of quantizer 107 in the same manner as the video-phone subscribers reconstruct the lower quality version of the HDTV signal. This reconstructed signal within encoder 110 is used for forming the prediction signal fed back on lead 106 to subtracter for processing of the next frame. Inverse quantizer ($Q^{-1}$) 112 remaps the quantized DCT coefficients in each block back into actual coefficient values and then inverse discrete cosine transformer (IDCT) 113 transforms these blocks of coefficients back to actual differential pel values equivalent to the differential pel values at the output of subtractor 105. Specifically, the output of inverse transformer 113 is equal to $d\bar{B}_1 + q_1$, where $q_1$ is the quantization noise introduced by quantizer 107. These blocks of reconstructed differential pel values are added by adder 116 to the corresponding blocks of pel values from the previous frame at the output of predictor 115 on lead 106 to form blocks of current frame values that are then stored in the frame memory of predictor 115 for processing of the next video frame. The output of adder 116 is thus equal to $B_1 + q_1$.

Although the basic layer encoder 110 has been described above as being compatible with the H.261 DCT/DPCM coder, if such compatibility is not a requirement, encoder 110 could employ signal transforms other than the discrete cosine transformation.

The contribution layer is formed by quantizing and entropy coding the differential bandwidth-split frequency bands of the HDTV high quality input signal by a contribution layer encoder 150. The input HDTV digital signal on input lead 101 is input to a subtractor 120 within encoder 150. Subtracter 120 outputs the difference between these pel values in the current HDTV video frame on input 101 and predicted pels on lead 121 that are those pels in the previous coded and decoded video frame stored in predictor 122 and which spatially correspond to the input pels. The resultant differential signal at the output of subtractor 120 is decomposed in two dimensions into ten non-uniform bands by bandwidth splitter 123, as shown in FIG. 3. In the specific embodiment described herein, bandwidth splitter 123 is an asymmetric two-dimensional quadrature-mirror filter. This filter comprises low-pass and high-pass filter sections. In the preferred embodiment, the sections that together produce the lowest frequency band should be substantially identical to the output of filter 102 into the basic layer encoder 110. Filter structures other than a quadrature-mirror filter could also be employed to decompose the differential signal, such as wavelet, or pyramidal decomposer. Also, although described as performing a two-dimensional horizontal and vertical decomposition, a decomposition in only the horizontal or vertical directions alone could also be performed. The output of bandwidth splitter 123 consists of ten differential bands, $dB_1, dB_2, \ldots, dB_{10}$. Although the filters in bandwidth splitter 123 that produce the lowest band, $dB_1$, are substantially equal to the filters comprising low-pass filter 102, the baseband output of splitter 123, $dB_1$, is not equal to the output, $d\bar{B}_1$, of subtracter 105 in the basic layer encoder 110 due to the different quantization noise added to the previous frame for each level. The second through the 10th band, $dB_2$–$dB_{10}$, are those component bands of the full HDTV spectrum not coded by the basic layer encoder 110, and which must be included within the contribution layer for reconstruction of the high quality HDTV signal from the combination of the basic and contribution layers. These nine differential bands are separately quantized by quantizers 124-2–124-10 and coded by entropy coders 125-2–125-10, respectively. The outputs of these coders are multiplexed together by multiplexer 126 for transmission over a transmission channel 127.

As described previously, when the basic layer, comprising the baseband $B_1$, is coded for transmission at a very low bit rate, such as in the present embodiment in which the basic layer is coded for video-phone H.261 compatibility at 64 kb/s, the quantization noise necessarily imposed on the baseband signal will significantly affect the quality of the reconstructed higher quality signal. Thus, no matter how finely the higher frequency subbands are quantized in the contribution layer encoder 150, a video signal reconstructed from a coarsely quantized baseband and finely quantized higher frequency bands will have significant visual impairment. In order to mitigate the effect of the coarsely quantized baseband signal, therefore, a residual signal component is included within the contribution layer. This residual signal component is formed by combining the reconstructed baseband signal from the basic layer encoder 110, the baseband portion of the reconstructed high quality signal of the previous frame produced by contribution layer encoder 150, and the baseband portion of the differential signal at the output of bandwidth splitter 123. Specifically, the predicted signal from the previous frame on lead 121 at the output of predictor 122 is filtered by a two-dimensional low-pass filter 140, similar to filter 102, to produce a baseband output $B_1$. This previous frame baseband from contribution layer encoder 150 is subtracted by subtracter 141 from the reconstructed baseband signal of the current frame at the output of adder 116 in basic layer encoder 110. This latter signal is equal to $B_1 + q_1$, where $q_1$ is, as noted, the quantization noise introduced by quantizer 107. The difference, $B_1 + q_1 - B_1$, on lead 142 is input to subtracter 130, which subtracts the differential baseband, $dB_1$, at the output of bandwidth splitter 123 from it. Since, however, $dB_1$ is equal to the difference between the baseband $B_1$ and the predicted baseband $B_1$, $B_1 - B_1$, the net output of subtracter 130 is equal to $q_1$, the quantization noise introduced in the basic layer encoder 110. The resultant residual signal component, which represents the quantization noise $q_1$, is requantized by a more accurate quantizer 124-1 to reduce the overall quantization noise to $q_1 - q_{21}$, where $q_{21}$ is equal to the quantization noise introduced by quantizer 124-1. This residual signal component is coded by entropy coder 125-1 and multiplexed by multiplexer 126 with the other components to form the total contribution layer signal. Therefore by designing quantizer 124-1 so that its quantization noise, $q_{21}$, is much less than the quantization noise, $q_1$, imposed by quantizer 107 in the basic layer encoder 110, the effect of the large quantization noise imposed on the baseband signal can be substantially eliminated in the reconstruction of the high quality signal from the combination of the basic layer signal and the contribution layer signal.

The prediction signal fed back from predictor 122 over lead 121 to subtractor 120 is an HDTV signal and is formed in the same manner that a receiver/decoder (not shown) reconstructs a high quality video signal from both a received basic layer signal and a contribution layer signal. In a feedback loop, inverse quantizer 131-1 remaps the quantized residual signal component to actual signal levels equal to $q_1-q_{21}$. Subtracter 132 subtracts this signal from the output of subtracter 141, heretofore noted as being equal to $B_1+q_1-B_1$. The resultant output, equal to $B_1-B+q_{21}$, or equivalently $dB_1+q_{21}$, is therefore substantially free of the quantization noise imposed by quantizer 107 in the basic layer encoder 110. Inverse quantizers 131-2–131-10 remap the quantized levels at the outputs of quantizers 124-2–124-10 back to the differential signal levels, $dB_2-dB_{10}$, respectively, but which each differ from their original values by the quantization noise imposed by their respective quantizers.

The output of subtracter 132 and the outputs of inverse quantizers 131-2–131-10 are input to bandwidth reconstructor 133, which reconstructs the full bandwidth high quality HDTV differential signal. The differential pel values in this signal are added by adder 134 to the spatially corresponding reconstructed pel values of the previous frame that are stored in predictor 122. The resultant sums on lead 135 are the reconstructed high quality HDTV pels of the current video frame, which are then stored within predictor 122 for processing of the next video frame.

As noted, reconstruction of the high quality HDTV video signal described hereinabove is identical to reconstruction of the high quality HDTV video signal from the combination of a received basic layer signal and a received contribution layer signal by a receiver/decoder (not shown). A receiver/decoder therefore demultiplexes the component signals in the contribution layer signal, entropy decodes each signal component, and inversely quantizes each signal component. Similarly, the basic layer signal is entropy decoded, inversely quantized and inversely DCT transformed. The basic layer signal is then combined with the recovered residual signal component in the contribution layer signal and the resultant signal is combined with the other signal components to reconstruct the high quality differential pel elements of the current frame. These high quality differential pel elements are added to the corresponding stored reconstructed high quality video pel elements of the previous frame to form the pel elements of the current frame for output to a visual display device. The pel elements of the current frame are then stored for combination with the recovered differential pel elements of the next video frame.

The dual layer structure of the present invention codes the baseband signal using a highly efficient hybrid DCT/DPCM coding scheme that is compatible with standardized coders such as the aforenoted CCITT compatible H.261 coder. The MPEG (Motion Picture Experts Group) video coding algorithm is also hybrid DCT/DPCM based coding scheme (ISO-/IEC/JTC1/SC2/WG11 CD 11172-2, "Coding of Moving Pictures and Associated Audio," August, 1991). In those structures in which the basic layer signal is coded for transmission at a bit rate higher than the 64 kb/s in the embodiment described hereinabove, such as for transmission over T1 facilities at 1.544 mb/s, a residual signal component within the contribution layer encoder is not necessary since the quantization noise imposed by the quantizer within the basic level encoder will not be so large so as to require compensation in reconstructing the high quality HDTV video signal. In that case, the contribution layer signal will only consist of the multiplexed, entropy coded, quantized, frequency split, differential subbands other than the baseband. In FIG. 1, the high quality video signal reconstructed in the feedback loop of the contribution layer encoder 150 is thus reconstructed by bandwidth reconstructor 133 only from the output of subtracter 141 and the outputs of inverse quantizers 131-2–131-10.

As previously noted, it has been assumed that neither predictor 115 in the basic layer encoder 110 nor predictor 122 in the contribution layer encoder 150 included motion estimation. It is often desirable, however, to include motion estimation in the prediction algorithm because of the improved coding efficiency likely to be achieved using motion estimation in frame-to-frame predictions. In order for both the basic layer and the contribution layer to be coded in total harmony, however, a relationship must exist between the estimated motion displacement of corresponding blocks of pels in each layer. This is a particular necessity because of the interconnection of the feedback loop from the basic layer encoder 110 to the feedback loop in the contribution layer encoder 150 for reconstructing the high quality video input signal. Accordingly, motion estimation can be performed either upwardly or downwardly. In the first arrangement, the components of the motion vectors for each block of pels in the "mini" baseband frame coded by the basic layer encoder 110 are calculated and then converted and more precisely determined for corresponding blocks in the full HDTV frame coded by contribution layer encoder 150. In the second arrangement, the components of the motion vector for each block of pels in the HDTV frame are calculated and then converted to components of a motion vector associated with the corresponding smaller block in the "mini" frame.

Figure 4:
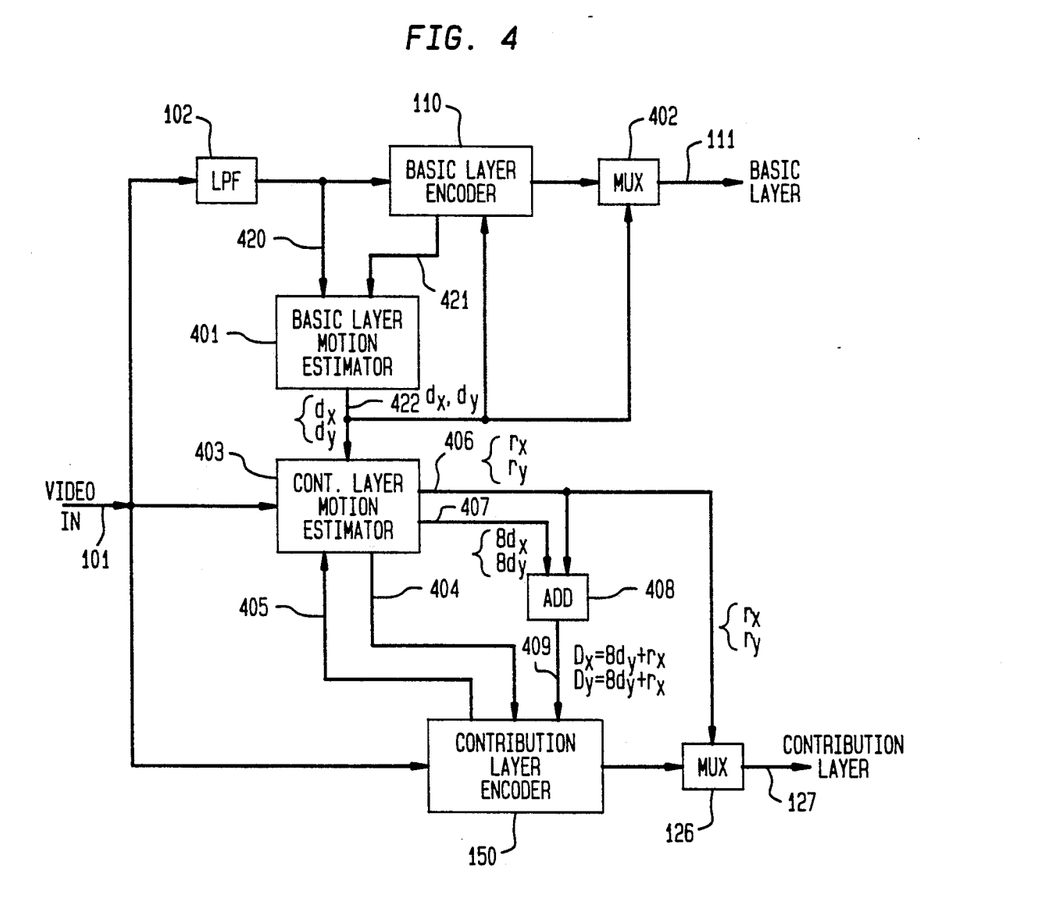
FIG. 4 is a block diagram of the multilevel coder of the present invention which incorporates one method of interframe motion estimation.

FIG. 4 is a block diagram of the multilevel coder of the present invention as modified to incorporate motion-estimation processing. To avoid complexity in the figure, the block classification components which classify each block of pel data as either intraframe, interframe motion-compensated, or interframe non-motion-compensated are not shown. The inclusion of block classification, however, would be obvious to one skilled in the art. Similar numerical designations have been are given to those elements common to both FIGS. 1 and 4.

In FIG. 4 motion-estimation is performed upwardly. Accordingly, motion estimation is performed first on the baseband signal. The baseband signal at the output of low-pass filter 102, representing the "mini" input frame is input to basic-layer motion-estimator 401 in 16×16 blocks of pel data over lead 420. The previous coded frame stored in the predictor 115 (in FIG. 1) of the basic layer encoder 110 is also input to motion-estimator 401 over lead 421. Using any one of many well known motion-estimation algorithms, motion-estimator 401 determines, for each block of pel data at the output of filter 102, the motion vector components, $d_x$ and $d_y$, of the estimated frame-to-frame translation. These motion components are then fed over output 422 to the predictor 115 in the basic layer encoder 110 effect the output to subtracter 105 of the block of pels in the stored previous frame at the address associated with those vector components (shown in FIG. 1). These same motion vector components, for each input block, are also multiplexed by multiplexer 402 with the output of the basic layer encoder 110 for transmission over channel 111.

The 128×128 block HDTV data corresponding to the 16×16 block of data processed by the basic layer encoder 110 is input to contribution layer motion-estimator 403. Also input to estimator 403 are the basic layer motion vector components, $d_x$ and $d_y$, which are each multiplied by the scaling factor of eight, eight being the relationship in the horizontal and vertical directions between the spatial resolution of the baseband signal and the HDTV signal. The resultant motion components, $8d_x$ and $8d_y$, are input over lead 404 to the contribution layer encoder 150, which outputs over lead 405 the stored pel data from the previous coded frame in the 128×128 block associated with those motion vector components. A better match might be obtained, however, between the 128×128 input block and the block in the previous frame that is determined from the motion vector components $8d_x$ and $8d_y$. Specifically, since a difference of one pel in $d_x$ or $d_y$ in the "mini" frame results in a difference of eight pels in the HDTV frame, a more precise match cannot be obtained using the values of $d_x$ and $d_y$ determined by motion-estimator 401 alone. A better match is likely to obtained between the input 128×128 block and the previous stored frame at a more precisely determined location within a window that surrounds the 128×128 block whose address is determined by the motion vector components $8d_x$ and $8d_y$. Accordingly, using the same motion estimation algorithm employed by estimator 401, estimator 403 determines the location of the best match between the current 128×128 block and a 128×128 block within a window that surrounds by four pels in each direction, the block determined from the motion vector components $8d_x$ and $8d_y$. Estimator 403 outputs on lead 406 the x-component, $r_x$, and the y-component, $r_y$, of the deviation from the center of the determined best matching block within this window, where $r_x$ and $r_y$ are each between −4 and +4. Estimator 403 also outputs on lead 407 the components $8d_x$ and $8d_y$, which are then added by adder 408 with the respective deviation components, $r_x$ and $r_y$, on lead 406 to produce the motion vector components of this best matching block within the HDTV frame. These motion vector components on lead 409, $D_x$ and $D_y$, are thus equal to $8d_x + r_x$ and $8d_y + r_y$, respectively. The predictor 122 (shown in FIG. 1) within contribution layer encoder 150 uses $D_x$ and $D_y$ to locate and output this best matching block in the previous frame to the subtracter 120 (shown in FIG. 1). In order for a receiver/decoder to accurately decode the received data, the components $r_x$ and $r_y$ for each input block of HDTV pel data on lead 406 are multiplexed by multiplexer 126 together with the plural outputs of the entropy coders 125-1–125-10 (in FIG. 1) within contribution layer encoder 150. The receiver/decoder, receiving both the basic layer and the contribution layer can then determine $d_x$ and $d_y$ from the basic layer and $r_x$ and $r_y$ from the contribution layer, and from those determine $D_x$ and $D_y$, for each 128×128 block of HDTV data.

Figure 5:
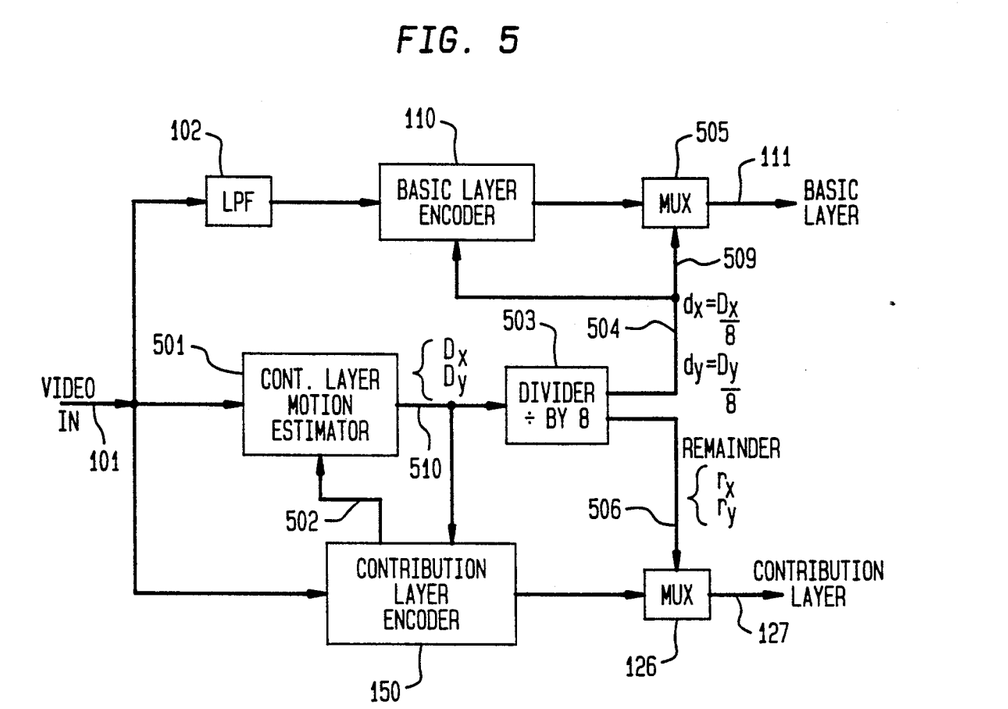
FIG. 5 is a block diagram of the multilevel coder of the present invention which incorporates a second method of interframe motion estimation.

FIG. 4, described hereinabove, illustrates upward motion estimation in which motion estimation of each input block is first performed on the "mini" baseband frame and the results are then used to refine the motion estimation for the corresponding larger HDTV block in the HDTV frame. FIG. 5, on the other hand, illustrates downward motion estimation in which motion estimation is first performed for the larger blocks in the HDTV frame, and the resultant motion vector components are then used to determine the motion vector components for the smaller corresponding block in the "mini" baseband frame. As in FIG. 4, similar numerical designations are given to those elements common to both FIGS. 1 and 5. Also, as in FIG. 4, block classification is not shown to reduce complexity.

With reference to FIG. 5, current HDTV pel data in blocks of 128×128 are input to contribution layer motion-estimator 501 and to the contribution level encoder 150 via input lead 101. Also input to estimator 501 over lead 502 is the previous coded HDTV frame stored in the frame memory of predictor 122 (in FIG. 1) of encoder 150. Estimator 501, using any one of several well known motion-estimation algorithms locates the best match between the current input block and the stored reconstructed pel data from the previous frame and outputs, on lead 510, the motion vector components, $D_x$ and $D_y$, of this best match. These components are input to encoder 150 to locate this best matching block so that predictor 122 can output that block to subtracter 120 in the encoder 150 of FIG. 1. In order to locate the motion vector components $d_x$ and $d_y$ of the corresponding best matching block in the baseband "mini" frame, divider 503 divides $D_x$ and $D_y$ by the scaling factor, eight. Since $d_x$ and $d_y$ can only be integer values, $$d_x = \frac{D_x}{8} \text{ and } d_y = \frac{D_y}{8},$$

where represents the largest integer of the within expression. These motion vector components, $d_x$ and $d_y$, are input over lead 504 to basic layer encoder 110 where the block at that address stored within the frame memory of predictor 115 is output over lead 106 to subtracter 105. For each input block of data, the components $d_x$ and $d_y$, on lead 509, are multiplexed by multiplexer 505 with the output of entropy coder 108 (FIG. 1) in basic layer encoder 110. Since $D_x$ and $D_y$ are not likely to be evenly divisible by eight, their respective remainders, $r_x$ and $r_y$, are required by the high quality HDTV decoder to determine $D_x$ and $D_y$ from the components $d_x$ and $d_y$ received in the basic layer. Accordingly, these remainders at the output of divider 503 on lead 506 are multiplexed by multiplexer 126 together with the outputs of entropy coders 125-1–125-10 (FIG. 1) within the contribution layer encoder 150 to form the contribution layer transmitted on channel 127. The high quality video decoder/receiver (not shown), which receives both the basic and contribution layers can then determine for each block, the appropriate components of the motion-estimation vectors.

Although the downward motion-estimation described above is more efficient than upward motion-estimation described previously, more complex hardware is required to perform the necessary calculations.

In the embodiment of the present invention shown in FIG. 1 and described hereinabove the high quality HDTV input signal is efficiently coded into a basic layer signal and a single contribution layer. As described, a low quality video-phone signal can be reconstructed from a received basic layer signal or a high quality HDTV signal can be reconstructed from the combination of both the basic layer and contribution layer signals. An intermediate quality video signal could also be reconstructed by forming two contribution layer signals in addition to the basic layer signal. The intermediate quality signal would then be reconstructed from the combination of the basic layer signal and a first contribution layer signal and the high quality signal would be reconstructed from the combination of the basic layer signal and both contribution layer signals. Modification of the embodiment shown in FIG. 1 to produce two or more contribution layer signals could readily be accomplished by one skilled in the art using the teachings described hereinabove.

Figure 6:
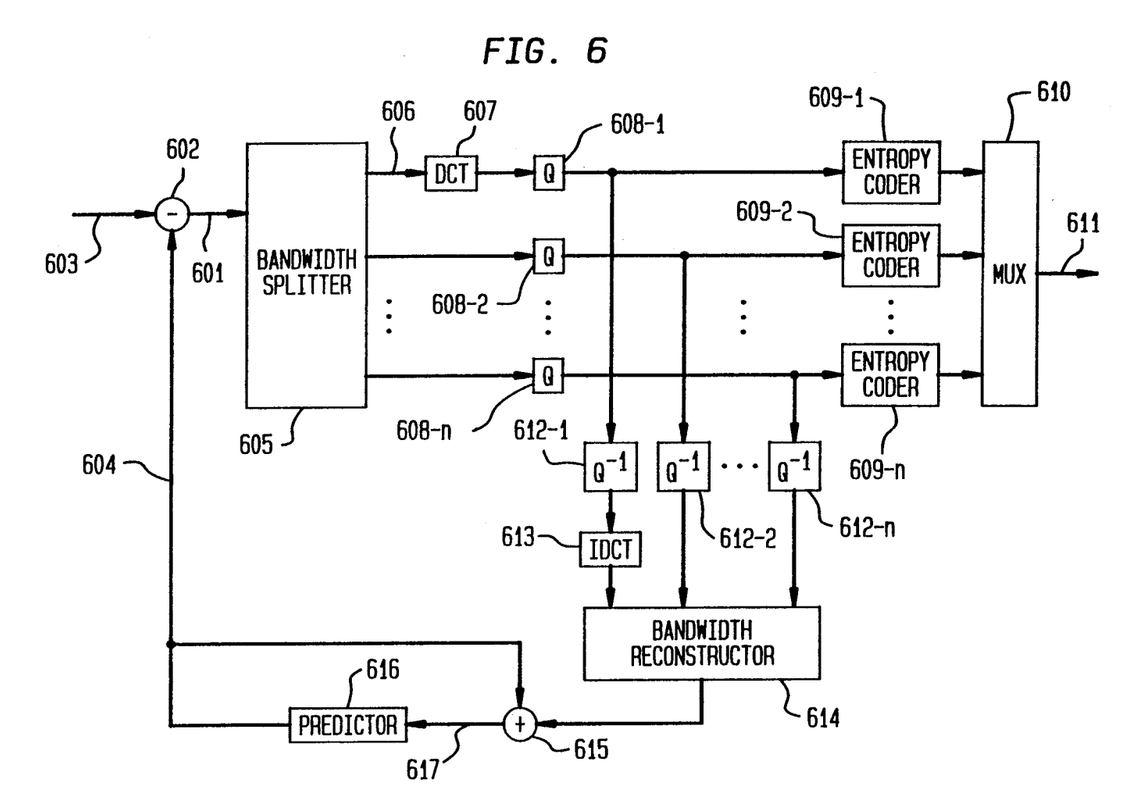
FIG. 6 is a block diagram of a single layer coder which uses the coding algorithm of the present invention.

When providing a multilevel video signal output is not the main object in coding a high quality video signal for transmission, using the coding algorithm of the present invention results in highly efficient coding performance. With reference to FIG. 6, a block diagram of a single level encoder using the coding algorithm of the present invention is shown. In accordance with this algorithm, a differential digital video signal is formed on lead 601 at the output of subtracter 602 from the difference between the digital input video signal on input 603 and a predicted video signal on lead 604 that is derived from a stored reconstructed previous video frame. The differential video signal on lead 601 is frequency decomposed in two directions into n subbands by bandwidth splitter 605, which uses quadrature-mirror filtering, pyramidal decomposition, wavelet, perfect reconstruction filtering, or any other subband decomposition. The lowest differential frequency subband, the baseband, on lead 606 is processed by a discrete cosine transformer 607, and the resultant coefficients are quantized by a quantizer 608-1. Other types of signal transformers could also be employed. Entropy coder 609-1 codes the quantized coefficients using a combination of run-length and variable-length coding. The other n−1 differential frequency subbands at the output of bandwidth splitter 605 are directly quantized by quantizers 608-2–608-n, and entropy coded by coders 609-2–609-n, respectively. The outputs of all the coders, 609-1–609-n, are then combined by multiplexer 610 into a single bit stream for transmission over channel 611.

The current input video frame is reconstructed in the feedback loop for processing of the next video frame. Inverse quantizer 612-1 remaps the output of quantizer 608-1 into DCT coefficient values and inverse discrete cosine transformer 613 converts these coefficient values back to baseband differential signal levels. Inverse quantizers 612-2–612-n remap the outputs of quantizers 608-2–608-n, respectively, into differential signal subband signal levels. The baseband differential signal levels at the output of inverse discrete cosine transformer 613, and the other differential signal subband signal levels at the outputs of inverse quantizers 612-2–612-n are combined by a bandwidth reconstructor 614, which reconstructs differential signal levels comparable to the differential signal levels at the output of subtracter 602. These differential levels are added by adder 615 to corresponding signal levels from the previous frame stored in predictor 616 to produce, at the output of adder 615 on lead 617, a reconstructed version of the input video signal at the input 603. The reconstructed current video frame is stored in predictor 616 for processing of the next video frame. Predictor 616 can also incorporate motion estimation. The combination of DCT processing on the most critical baseband subband, together with DPCM processing of the other subbands, results in a coder performance that is superior to that obtained with other prior art structures.

Structurally, since only one feedback loop is required for single layer operation, the encoder in FIG. 6 is much simpler than the multilayer coder in FIG. 1.

The above-described embodiments are illustrative of the principles of the present invention. Other embodiments could be devised by those skilled in the art without departing from the spirit and scope of the present invention.

What is claimed is:

1. A signal coder for coding an input video signal into a basic layer signal and at least one contribution layer signal, a video signal having a spatial resolution lower than the spatial resolution of the input video signal being reconstructible from the basic layer signal, and a video signal having a spatial resolution higher than the lower spatial resolution and up to the resolution of the input video signal being reconstructible from the combination of the basic layer signal and the at least one contribution layer signal, the signal coder comprising:

means for receiving an input signal consisting of pel values of a scanned video signal, said video signal consisting of sequential video frames, means for filtering the video signal to produce a baseband sequence of filtered pel values for each video frame, interframe hybrid transform/differential pulse code modulation coding means for coding the baseband sequence of filtered pel values for each video frame to form the basic layer signal, means for forming a differential video signal of each frame from the difference between the pel values in a current video frame and predicted pel values derived from the pel values in a previous coded video frame, means for decomposing the differential video signal of each frame into plural subband sequences of filtered differential pel values, means for separately quantizing and entropy coding the plural subband sequences of filtered differential pel values, and means for combining at least some of the quantized and encoded subband sequences of filtered differential pel values to form the at least one contribution layer signal.

2. A signal coder in accordance with claim 1 wherein said means for decomposing the differential video signal of each frame is a quadrature-mirror filter.

3. A signal coder in accordance with claim 1 further comprising means for including a residual signal component within said at least one contribution layer signal, said residual signal component being formed from the combination of: (a) a baseband signal derived from said interframe hybrid transform/differential pulse modulation means that is a reconstructed version of the baseband signal at the output of said means for filtering the video signal, (b) a baseband signal derived from the predicted pel values in a previous coded video frame from said means for forming a differential video signal, and (c) a baseband sequence of filtered differential pel values at one output of said means for decomposing the differential video signal.

4. A signal coder in accordance with claim 1 wherein said interframe hybrid transform/differential pulse code modulation coding means comprises hybrid discrete cosine transform/differential pulse code modulation coding means for producing blocks of quantized differential discrete cosine transformed baseband pel values.

5. A signal coder in accordance with claim 4 wherein said interframe hybrid transform/differential pulse code modulation coding means further comprises means for entropy coding the blocks of quantized differential discrete cosine transformed baseband pel values.

6. A signal coder in accordance with claim 4 further comprising means for forming motion estimates of frame-to-frame translations of blocks of baseband pel values in a current video frame relative to corresponding blocks of baseband pel values in a previous video frame, and means for converting the motion estimates of the blocks of baseband pel values in the current frame into motion estimates of corresponding blocks of pel values of the input video signal in the same current video frame.

7. A signal coder in accordance with claim 4 further comprising means for forming motion estimates of frame-to-frame translations of blocks of pels in the input video signal in a current video frame relative to corresponding blocks of pels in a previous video frame, and means for converting the motion estimates of the blocks of pels in the current video frame into motion estimates of corresponding blocks of pels in the baseband sequence of filtered pel values in the same current video frame.

8. A signal coder in accordance with claim 4 wherein said hybrid discrete cosine transform/differential pulse code modulation means is a CCITT recommended H.261 coder.

9. A method for coding a input video signal into a basic layer signal and at least one contribution layer signal, the input video signal consisting of sequential video frames, a video signal having a spatial resolution lower than the spatial resolution of the input video signal being reconstructible from the basic layer signal, and a video signal having a spatial resolution higher than the lower spatial resolution and up to the resolution of the input video signal being reconstructible from the combination of the basic layer signal and the at least one contribution layer signal, the method comprising the steps of:

filtering the input video signal to produce a baseband sequence of filtered pel values for each video frame, coding the baseband sequence of filtered pel values using an interframe hybrid transform/differential pulse code modulation coder to form the basic layer signal, forming a differential video signal of each frame from the difference between the pel values in a current video frame and predicted pel values derived from the pel values in a previous coded video frame, decomposing the differential video signal of each frame into plural subband sequences of filtered differential pel values, separately quantizing and encoding the plural subband sequences of filtered differential pel values, and combining at least some of the quantized and encoded subband sequences of filtered differential pel values to form the at least one contribution layer signal.

10. The method of claim 9 wherein a quadrature-mirror filter decomposes the differential video signal into plural subband sequences of filtered differential pel values.

11. The method of claim 9 further comprising the steps of estimating frame-to-frame translations of blocks of baseband pel values, and converting the estimated frame-to-frame translations of blocks of baseband pel values into estimated frame-to-frame translations of corresponding blocks of pels in the current video frame 12. The method of claim 9 further comprising the steps of estimating frame-to-frame translations of blocks of pels in the input video signal, said estimated frame-to-frame translations being used to form the difference between the pel values in a current video frame and predicted pel values derived from pel values in a previous coded frame, and converting the estimated frame-to-frame translations of the blocks of pels in the current video frame to estimated translations of corresponding blocks of pels in the baseband sequence of filtered pel values.

13. The method of claim 9 further comprising the step of including a residual signal component within the at least one contribution layer signal, the residual signal being derived from the combination of: (a) a baseband signal derived from the interframe hybrid transform/differential pulse code modulation coder that is a reconstructed version of the baseband signal produced at said step of filtering the input video signal, (b) a baseband signal derived from predicted pel values in a previous coded video frame produced at the step of forming a differential video signal of each frame, and (c) a baseband sequence of filtered differential pel values produced at the step of decomposing the differential video signal of each frame into plural subband sequences.

14. The method of claim 9 wherein the interframe hybrid transform/differential pulse code modulation coder is a hybrid discrete cosine transform/differential pulse code modulation coder that produces blocks of quantized differential discrete cosine transformed baseband pel values.

15. The method of claim 14 further comprising the step of entropy coding the blocks of quantized differential discrete cosine transformed baseband pel values.

* * * * *

UNITED STATES PATENT AND TRADEMARK OFFICE
CERTIFICATE OF CORRECTION

PATENT NO.        : 5,253,058
APPLICATION NO. : 07/861627
DATED             : October 12, 1993
INVENTOR(S)       : Hamid Gharavi It is certified that error appears in the above-identified patent and that said Letters Patent is hereby corrected as shown below:

On Title Page Item (56) under "OTHER PUBLICATIONS", line 5, after "79-123." insert -- M. Ghanbari, "Two-Layer Coding of Video Signals for VBR Networks," IEEE Journal on Selected Areas in Communications, Vol. 7, No. 5, June 1989, pp. 771-781 --.

Signed and Sealed this

Fifth Day of December, 2006

JON W. DUDAS
*Director of the United States Patent and Trademark Office*